United States Patent
Bocanegra et al.

(10) Patent No.: US 6,934,452 B2
(45) Date of Patent: Aug. 23, 2005

(54) OPTICAL FIBER CABLES

(75) Inventors: Luis M. Bocanegra, Alpharetta, GA (US); Harold P. Debban, Snellville, GA (US); Jennifer R. Meeks, Lawrenceville, GA (US); Kenneth L. Taylor, Lawrenceville, GA (US); Peter A. Weimann, Atlanta, GA (US)

(73) Assignee: Furukawa Electric North America Inc., Norcross, GA (US)

( * ) Notice: Subject to any disclaimer, the term of this patent is extended or adjusted under 35 U.S.C. 154(b) by 0 days.

(21) Appl. No.: 10/706,585

(22) Filed: Nov. 12, 2003

(65) Prior Publication Data

US 2005/0089285 A1 Apr. 28, 2005

Related U.S. Application Data (63) Continuation-in-part of application No. 10/420,309, filed on Apr. 22, 2003, now Pat. No. 6,721,480.

(51) Int. Cl.$^7$ ................................................ G02B 6/44
(52) U.S. Cl. ........................................................ 385/114
(58) Field of Search ................................ 385/114, 113, 385/111, 112, 110, 109

(56) References Cited

U.S. PATENT DOCUMENTS

| | | | | |
|---|---|---|---|---|
| 5,384,880 A | * | 1/1995 | Keller et al. | 385/109 |
| 5,457,762 A | * | 10/1995 | Lochkovic et al. | 385/114 |
| 5,748,823 A | * | 5/1998 | Nave | 385/113 |

* cited by examiner

*Primary Examiner*—Chandrika Prasad
(74) *Attorney, Agent, or Firm*—Peter V. D. Wilde

(57) ABSTRACT

The specification describes an improved optical fiber cable wherein the cable cross section is round and contains a plurality of bundled optical fibers. The bundle may comprise randomly arranged optical fibers or optical fibers aligned in a ribbon configuration. The bundle is encased in a polymer encasement that couples mechanically to the optical fibers. In some embodiments the encasement is relatively hard, and is deliberately made to adhere to the optical fiber bundle. Consequently the encasement medium functions as an effective stress translating medium that deliberately translates stresses on the cable to the optical fibers. The cable construction of the invention is essentially void free, and provides a dry cable with water blocking capability.

16 Claims, 7 Drawing Sheets

OPTICAL FIBER CABLES

RELATED APPLICATION

This application is a continuation-in-part of application Ser. No. 10/420,309, filed Apr. 22, 2003 now U.S. Pat. No. 6,721,480 (Bocanegra 4-5-3-3-18).

FIELD OF THE INVENTION

This invention relates to optical fiber cables having improved optical transmission characteristics. More particularly, it relates to lightwave transmission cables containing optical fiber bundles, and which are designed to reduce bending losses.

BACKGROUND OF THE INVENTION

High capacity lightwave transmission cables frequently comprise multiple optical fibers organized in a ribbon or bundled fiber configuration. Conventional bundled fiber cables typically have two or more optical fibers randomly organized at the cable core. In an effort to increase the optical fiber density and space efficiency, optical fiber ribbons were designed. However, optical fiber bundles wherein the optical fibers are randomly organized are still widely used, especially for relatively small fiber counts.

It has long been recognized that bending of optical fibers is a principal signal loss mechanism. The smaller the bend radius (microbend) the more light escapes from the core of the fiber and is lost. When multiple fibers are arrayed in a cable, the microbending problem is influenced by the nature of the array, since bundles of fibers mechanically interact with one another, as well as with the cable sleeve. The use of optical fibers arrayed in ribbons controls that interaction to some degree, but optical fiber ribbons have their own unique microbending behavior. In an optical fiber ribbon with a rectangular cross section, the out-of-plane bending stiffness is significantly lower than the in-plane bending stiffness, giving rise to the so-called preferred bending axis. Among other consequences, this preferential bending characteristic can cause nonrandom stresses on certain fibers in the ribbon during cable loading. These stresses may degrade the signal transmission characteristics of the optical fibers in the cable. Thus optical fiber ribbons present special considerations in cabling.

It is also universally recognized in optical fiber cable design that a preferred approach to controlling microbending losses is to mechanically decouple the optical fibers from the surrounding cable. In this way mechanical impacts and stresses on the cable are not translated, or minimally translated, to the optical fibers. Various techniques have been used to achieve this. Early approaches involved placing the optical fiber or optical fiber bundle loosely in a relatively rigid tube. The object was to allow the fibers to "float" in the tube. In alternative designs, the optical fibers are coated with a primary coating, typically a polymer coating, and a cable sheath applied over the coating, also typically a polymer. The primary coating in this case is made soft, so that stresses experienced by the cable are inefficiently translated to the optical fibers within the cable. In yet another design aimed at the same goal, the optical fibers are coated with a gel to reduce mechanical coupling between the optical fibers and the surrounding cable sheath. See U.S. Pat. No. 6,035,087, issued Mar. 7, 2000.

The term "encasement" as used herein is defined as the primary medium that surrounds the optical fibers.

Optical fiber cabling techniques that have a design goal of decoupling of optical fibers have met with only moderate success. This is partly due to the tendency of the bundled fibers within the cable to buckle or wrinkle when the cable is moderately bent. The wrinkles typically form on the inside radius of the bend. Whereas the bend itself may have a relatively large radius, a radius that is above the range where serious microbending losses would occur, the bends of the wrinkles are much smaller, and easily translate to the optical fibers causing microbending loss. Thus a technique for eliminating or minimizing these wrinkles in bundled optical fiber cables would represent an important advance in the technology.

A particularly thorough discussion of coatings or encasements for optical fiber ribbon cables appears in U.S. Pat. No. 6,317,542 issued Nov. 13, 2001, and in application Ser. No. 10/420,309, filed Apr. 22, 2003.

These references describes a variety of embodiments wherein conformal encasements are used for optical fiber ribbon stacks. The discussion of conformal encasements used to couple optical fibers to the rest of the cable structure is relevant to the discussion below, and these references are incorporated by reference herein.

STATEMENT OF THE INVENTION

We have discovered that, contrary to conventional practice, increasing the coupling between optical fiber bundles and the surrounding cable provides unexpected benefits, and reduces the tendency of optical fiber cables to buckle and wrinkle. This effect is especially pronounced if the optical fibers collectively exhibit a preferred bending axis, for example, an optical fiber ribbon. Increased coupling and reduced microbending loss is achieved by a combination of three features. First, a relatively high modulus encasement is used. Second, adhesion between the optical fibers and the encasement is promoted. The combination of a relatively stiff medium surrounding the optical fiber bundle and relatively high adhesion between the optical fiber bundle and the surrounding medium is important to allow stresses on the cable exterior to be translated to the optical fiber bundle. Translating the stresses to the optical fiber bundle allows the glass fibers in the optical fiber bundle to be used as compression strength members. Inhibiting compressive strain on the optical fiber bundle cable reduces markedly the tendency of the optical fiber bundle to form wrinkles on the interior of the bend radius. A measure of the effectiveness of this is the shrinkage factor of the encasement with respect to the optical fiber bundle, as will be described in more detail below.

The advantages of conformal coupled encasements apply also to other optical fiber bundle configurations. An example is a bundle of 2–20 optical fibers twisted or organized in a tight array, e.g. a hexagonal array of six fibers around a center fiber. These will be described in more detail below.

The optical fiber cable designs of the invention may be found especially suitable for air-blown installations.

DETAILED DESCRIPTION

As stated above, optical fiber bundles comprise two main categories, randomly bundled optical fibers, and optical fibers organized in a ribbon configuration. For convenience in this description, and because optical fiber ribbons present a special case of optical fiber bundle in terms of cable performance, the discussion below will focus on optical fiber ribbon cable. However, it will be understood by those skilled in the art that much of the description is equally applicable to optical fiber bundles with randomly organized fibers.

Figure 1:
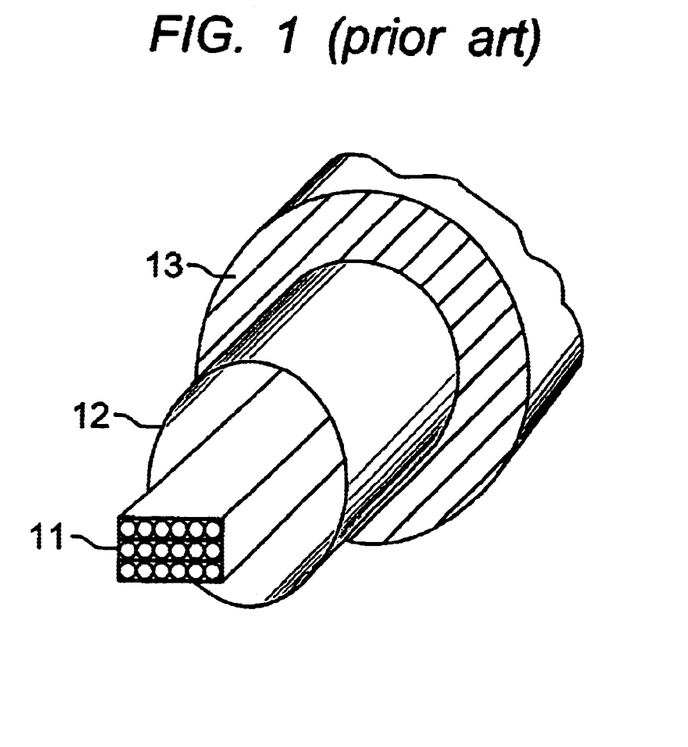
FIG. 1 is a perspective view of one prior art approach to cabling optical fiber ribbon stacks to minimize coupling of the stack to the cable structure.

Referring to FIG. 1, an optical fiber ribbon stack 11 is shown encased in a cable sheath. The cable sheath comprises tube 12 and tube coating 13. In this illustration, the optical fiber ribbon stack assembly has three ribbons, each ribbon with six fibers. Ribbons with four or eight fibers and more, are common and commercially available. It will be understood that these numbers are arbitrary for the purpose of illustration. For more details on the structure of optical fiber ribbons see U.S. Pat. No. 4,900,126, which is incorporated by reference herein. The number of fibers per ribbon may range from two to more than twenty. The number of ribbons in the stack may also vary substantially from the three ribbons illustrated here. These numbers will determine the aspect ratio of the stack, i.e. the width vs. height. Optical fiber ribbons may be stacked with the plane of the ribbons the long dimension of the stack, or the short dimension. In the latter case, there typically will be more optical fiber ribbons than optical fibers per ribbon. Thus it will be appreciated that a wide variety of configurations for the optical fiber ribbon stack are useful in the context of the invention. Optical fiber cables with a single ribbon are also to be considered within the scope of the invention. The arrangement shown in these figures is only by way of example.

In the embodiment of FIG. 1, the optical fiber stack 11 is essentially completely decoupled from the sheath tube 12. This is a so-called "loose tube" assembly, which is designed to allow the optical fiber stack to "float" inside the tube. When small bends or dents occur in the tube they are minimally translated to the optical fibers.

Figure 2:
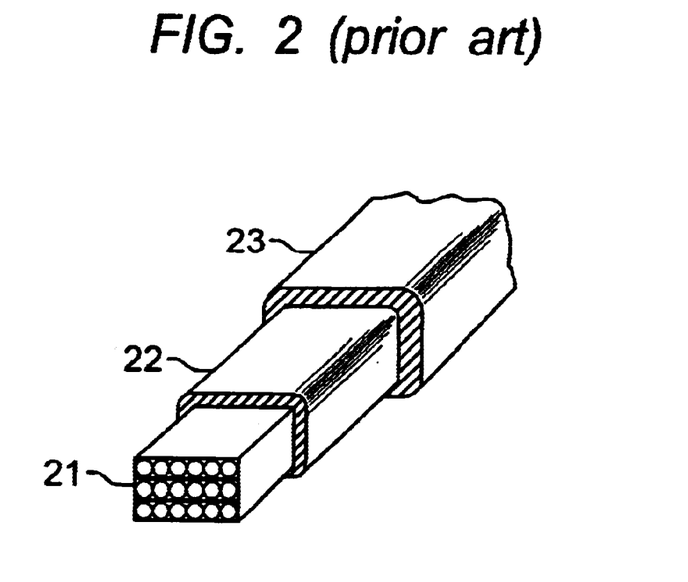
FIG. 2 is a perspective view of a second prior art approach to cabling optical fiber ribbon stacks.

An alternative optical fiber ribbon stack cable design is shown in FIG. 2. For more details on this design, refer to U.S. Pat. No. 6,317,542. The optical fiber ribbon stack is shown at 21, with a primary encasement 22 surrounding the optical fiber ribbon stack. A second coating layer 23 is shown formed over the encasement layer 22. In this design, stresses on the outside surface of the cable are decoupled from the optical fiber ribbon stack by two mechanisms. One, the encasement layer 22 is made of a relatively soft material. Intuitively, it can be appreciated that if the material 22 is soft, it is an inefficient force-translating medium. This may be viewed as an extension of the design theory of FIG. 1, where the material 22 is non-existent. The second mechanism for reducing force translation between the optical fiber ribbon stack and the encasement is to minimize the adhesion between the optical fiber ribbon stack and the encasement. If the optical fiber ribbon stack is free to slide within the encasement, tensile and compressive forces are less effectively coupled between them.

Figure 3:
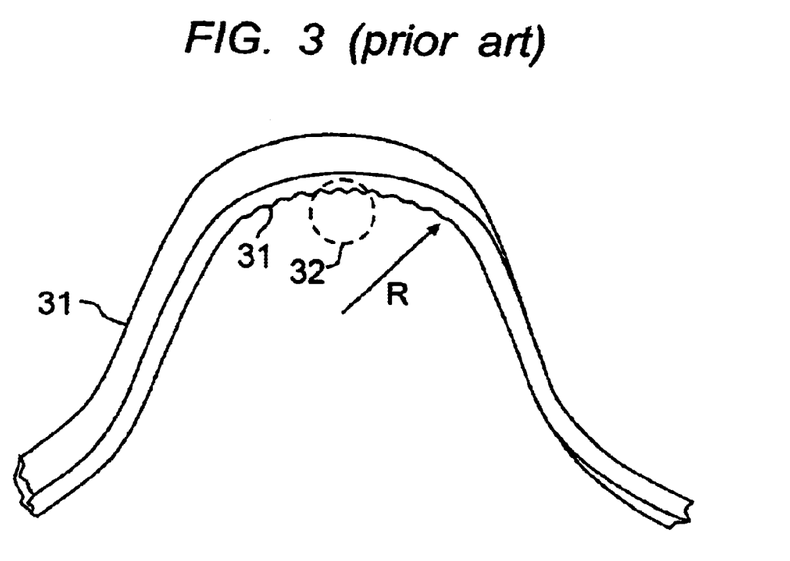
FIG. 3 is a schematic diagram illustrating the problem of wrinkling of the optical fiber ribbon stack encasement upon moderate bending of the cable.
Figure 4:
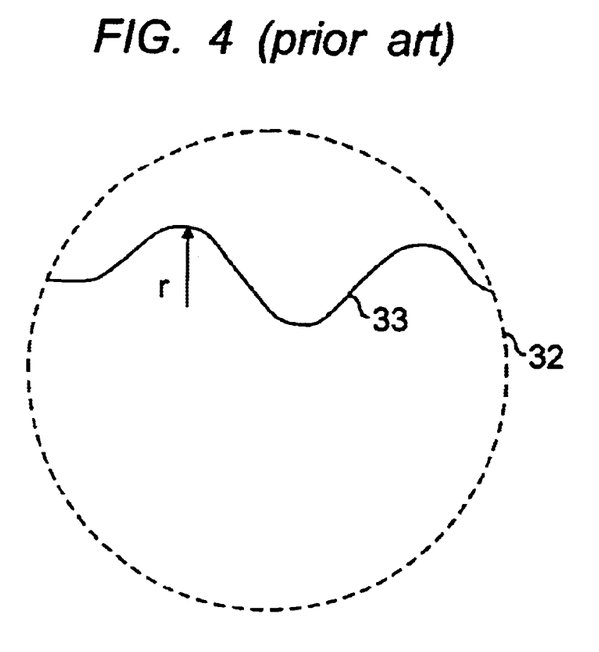
FIG. 4 is a schematic view showing the wrinkles of FIG. 3 in more detail.
Figure 5:
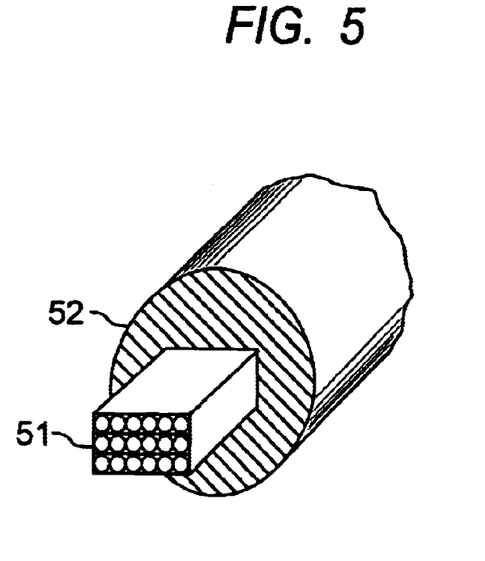
FIG. 5 is a perspective view of one embodiment of the optical fiber ribbon cable of the invention.

Additionally, the optical fiber ribbon stack cable design of FIG. 2 has a conformal encasement. There are several aspects of this that will be discussed in more detail below. However, it can be observed here that just as the optical fiber ribbon stack has a preferred bending axis, the encasement 22, and the secondary coating 23, also have preferred bending axes, axes that correspond to the preferred bending axis of the optical fiber ribbon stack. Thus this design has a very strong preferred bending axis. Due in part to that, the encasement has a tendency to buckle if the cable is subject to modest bending. This causes wrinkles to form in the encasement (as well as in the secondary coating 23). FIG. 3 illustrates this behavior. Optical fiber ribbon cable 31 is shown with a bend having approximate radius R. Wrinkles form on the inner side of the bend radius as shown at 31. The wrinkles tend to have a corrugated pattern that is seen in more detail in FIG. 4. As is evident, FIG. 4 is an enlargement of the circle 32 of FIG. 3. Whereas the stresses on the optical fiber ribbon stack resulting from a relatively large bend with radius R may not adversely affect the transmission characteristics of the optical fiber ribbon stack, the second order effect of the stresses from the wrinkles 33 (FIG. 4), with smaller radius r, may have significant detrimental effect. The coupled optical fiber bundle cable of the invention is designed to overcome or reduce the effect just described. The design of the invention as applied to ribbon bundles is shown in FIG. 5, where the optical fiber ribbon stack is shown at 51 and an encasement at 52. The encasement has important features that are contrary to the trends in the prior art. First, the material of encasement 52 is relatively rigid. This allows stresses on the outside of the encasement to be deliberately translated to the optical fiber ribbon stack. For this function it is recommended that the material of encasement 52 have an elastic modulus of more than 210 MPa, and preferably more than 300 MPa. Preferred specific materials for the encasement are polyolefins and ester-based polymers such as polyethylene, polypropylene, polyvinylchloride, ethylene-vinyl acetate polymers, ethylene acrylic acid polymers, ester-based polymers, and copolymers of the foregoing. These materials are given by way of example are not limiting of potential suitable materials. In each case the density and other properties of the polymers may be tailored by methods well known in the art to provide the mechanical characteristics of the invention, as well as other desired properties. For example, optical fiber ribbon stack cables that are used inside buildings may require fire-retardant polymers. An example is DGDA-638-NT, a fire-retardant low-smoke zero-halogen resin available from the Dow Chemical Company. At 23° C., this material has an elastic modulus of approximately 213 MPa. A non-fire retardant preferred material is DFDA-6115, a low-density polyethylene available from Dow Chemical Co. This material has an elastic modulus of approximately 213 MPa at 23° C.

A second feature of the encasement 52 is that it is made to adhere to the optical fiber ribbon stack. The combination of moderate adhesion between the optical fiber ribbon stack and the encasement, and a relatively stiff encasement medium, effectively translates stress to the optical fibers in the optical fiber ribbon stack. It is well known that glass fibers have high stiffness, both in tension and compression. In the optical fiber ribbon stack cable design of FIG. 5, the glass fibers act as compressive strength members, effectively preventing the cable from buckling or otherwise distorting. Long, slender structures such as fibers or ribbons are limited in their ability to act as a compressive stiffness member due to buckling. Once buckled, the effective compressive stiffness of the structure is dramatically lowered, and in some cases, effectively disappears. The presence of the encasement medium tends to retard the onset of buckling by increasing the compression strain energy threshold required to trigger the elastic instability. Thus an encasement formed according to the invention enables the fiber ribbon to carry a greater compressive load or strain before buckling. Furthermore, the encasement can act as a tangent stiffness matrix in the buckled state, restricting the magnitude of the lateral deflection of the ribbon and minimizing the extent to which the buckling reduces the effective compressive stiffness. A more specific discussion of these features is given below.

An additional feature of the coupled encasement is that it forms a natural water block. This eliminates the necessity for gel-filling or absorbent tapes.

Figure 6:
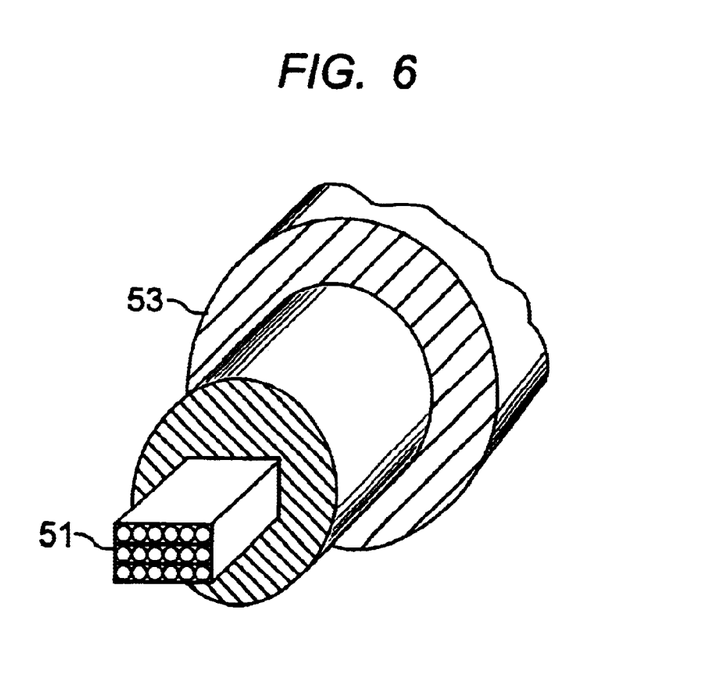
FIG. 6 is a perspective view of another embodiment of the optical fiber ribbon cable of the invention.

As shown in FIG. 6, the encased optical fiber ribbon stack may be provided with one or more additional outer layers 53. Typically these outer layers will be polymers with properties tailored to the intended application for the cable. The outer layer may be flame retardant, for customer premises applications. The outer layer 53 is preferably harder than coating 52, with a modulus of 250–2000 MPa. Other details of appropriate outer layer materials may be found in U.S. Pat. No. 6,317,542.

As mentioned earlier, the optical fiber cable designs of the invention may be especially well adapted for air blown installations. See U.S. patent application Ser. No. 10/233, 719, filed Sep. 3, 2002, incorporated by reference herein. Air blown fiber systems are now available as an alternative to conventional fiber optic cabling systems. These systems are designed to save space and time, and to facilitate system design changes. In an air blown fiber installation, the optical fiber medium is propelled through a pre-installed cable tube by a viscous air flow. Using this technique, the optical fiber medium is mechanically "pushed" into the duct concurrently with a stream of air, with the net force distributed along the fiber length rather than pulled from one end. Advantages in addition to simplicity and flexibility are that fiber breaks or excessive stress are minimized.

In a typical installation, the cable installation route comprises individual inner sub-ducts bundled inside a protective outer duct. A variety of duct styles is used, adapted specifically for use in plenum, riser, general purpose and outdoor applications. The inner sub-ducts may be small, e.g. 0.25 inch diameter, and up to two inches for large, high fiber count, cables. These ducts are frequently referred to as microducts.

Optical fiber that is installed in the microducts is frequently in the form of small bundles typically with 2–24 optical fibers, or in ribbons or stacked ribbons. For this application, the optical fiber medium should have physical characteristics that make it suitable for installation in microducts. The round or oval configuration of the cable of the invention meets this requirement. In the preferred case, installation of microduct cable in microduct is achieved using air blowing techniques. Success of optical fiber air blown installations depends on several conditions such as, diameter of the microduct cable, diameter of the microduct, friction characteristics of materials of the microduct, air flow rate, air pressure, amount of vertical rise, tube obstructions, tube discontinuities, etc. Especially important in this context are the properties of the microduct cable coating, in particular the frictional characteristics of the material forming the sheath. It is desirable to have a low friction surface to allow the microduct cable to easily slide within the microduct. However, at the same time it is desirable to have sufficient roughness at the sheath surface to provide enough dynamic air drag for the air stream to convey the microduct cable through the microduct. These requirements suggest a delicate design balance for the surface friction of the sheath covering microduct cable. An especially useful sheath design is described in U.S. patent application Ser. No. 10/233,719, filed Sep. 3, 2002, incorporated by reference herein.

When added cable strength is desired, a layer of fiberglass or aramid yarn may be provided between the encasement and an outer layer. This provides added tensile strength for cable pulling operations.

Figure 7:
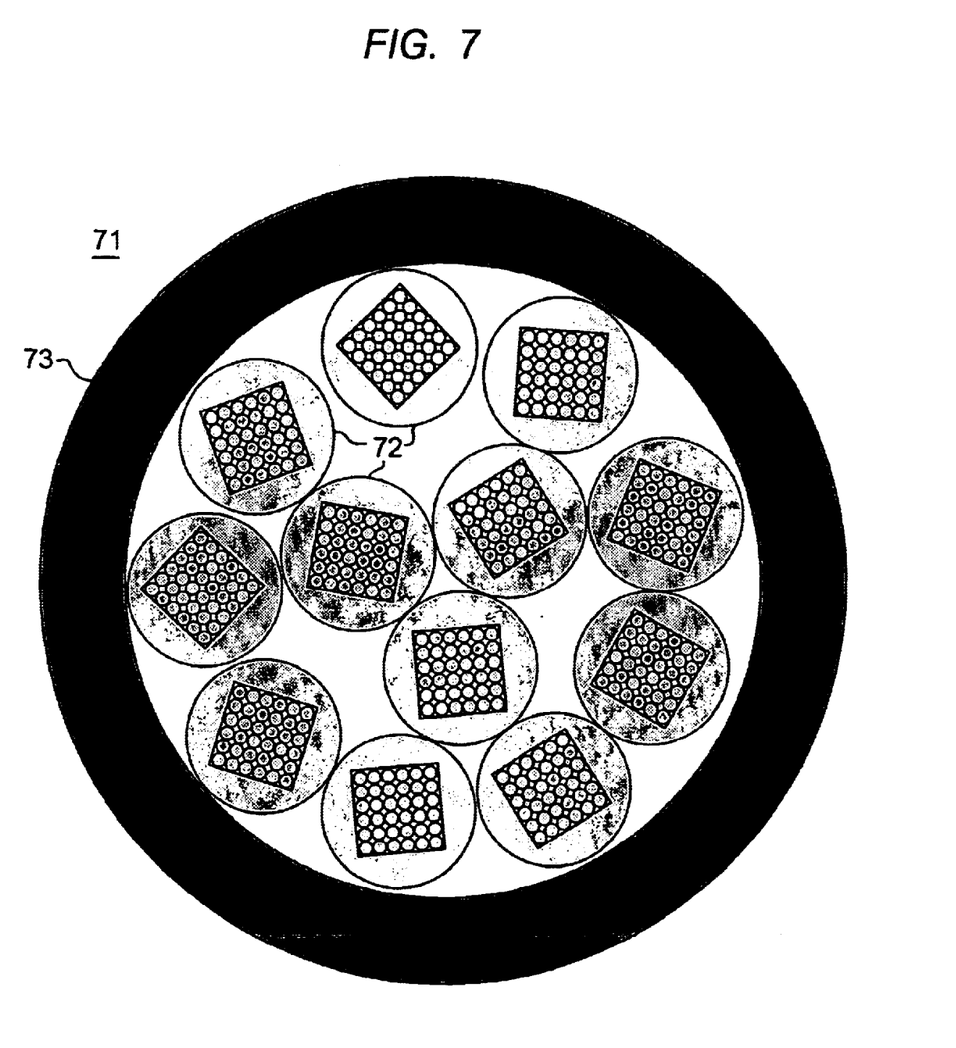
FIG. 7 gives diagrams of the optical fiber ribbon cable of FIG. 5 showing dimensions relevant to the description of the features of the invention.

For very high density (capacity) cables, more than one of the cable structures described above may be contained in a single cable, either stranded around a central member (as in a loose tube cable) or contained at the core of a central core cable. In this case, the multiple units within one cable may be "broken out" for convenient routing in customer premises or closures. A multiunit cable is shown in FIG. 7 where a large capacity optical fiber cable 71 is shown with twelve units 72 similar to that shown and described as FIG. 5. Obviously, many similar configurations may be used. The assembly of units 72 is surrounded by cable sheath 73. FIG. 7 shows a single sheath, but multiple layers can be used. For example, sheath 73 may comprise an inner sheath of compliant polymer surrounded by another sheath of wear and abrasion resistant polymer material. The space between the units 72 may be filled if desired, but is preferably unfilled and dry, containing dry superabsorbent material to block propagation of water.

In FIG. 7, the units each have 36 optical fibers. With 12 units as shown, the cable has an optical fiber count of 432. Such a large cable presents issues of optical fiber organization. The use of ribbons simplifies these issues significantly. In the units 72, because of the inherent organization of stacked ribbons, it is only essential to identify one fiber in the 6×6 matrix. Thus a single fiber may be color coded, or additional color coding may be used to more easily identify the fibers after stripping them from the ribbon. However, it will be recognized that in the large cable assembly 71, the round units are not inherently as well organized. In some applications, as suggested by the unit spacing in FIG. 7, the units will have the same organization throughout the cable length. Thus again, it is only essential to color code one unit. However, more than one unit may be color coded if desired.

Figure 8:
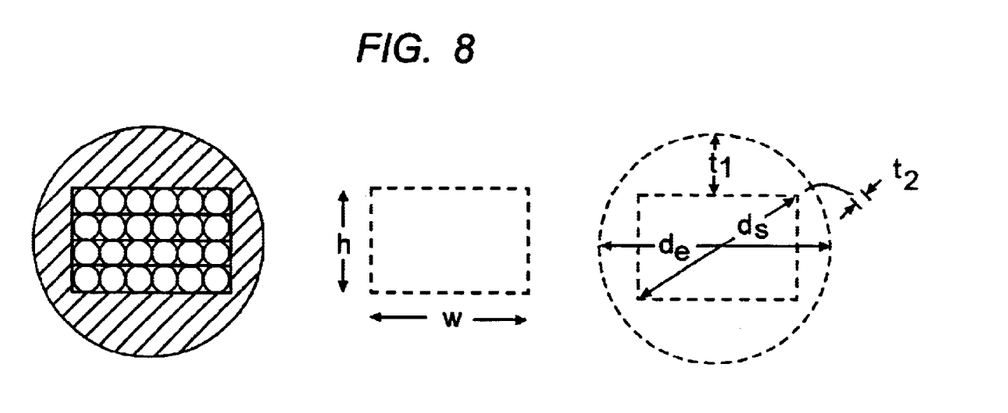
FIG. 8 is a schematic view illustrating stripping of the optical fiber ribbon cable of the invention.

The mechanical performance, and the related optical properties of the optical fiber ribbon stack 51 in FIGS. 5 and 6, will be strongly influenced by the material properties (as described above) and dimensions of the encasement layer 52. The outside diameter of the encasement layer may be related to the dimensions of the optical fiber ribbon stack using the diagrams of FIG. 8 to define the measurements. The optical fiber ribbon stack will have a height and width as shown, which may be equal but will typically have a width to height ratio of 1–2. The diagonal of the optical fiber ribbon stack, ds, is $(h^2+w^2)^{1/2}$. For convenience, $d_S$ will be taken as the relevant dimension for defining suitable thickness values for the encasement layer 52. This will ensure that sufficient coating material is provided at the corners of the optical fiber ribbon stack for protection of the optical fiber ribbon stack (refer to $t_2$ in FIG. 8), and unitary strength of the encasement layer. The outer diameter of the encasement layer, designated $d_E$ in FIG. 8, may then be prescribed as $d_S+2t_2$. The preferred range for the thickness $t_2$ at the corners of the optical fiber ribbon stack is 3–15 mils. This dimension is defined as the minimum thickness of the encasement. The overall diameter $d_E$ of the encasement layer and the optical fiber ribbon stack, in mils, is:

$$d_E = d_S + (6-30).$$

In the optical fiber ribbon stack shown in these figures, there are six optical fibers per ribbon, and three or four ribbons per stack. Typical dimensions for a four ribbon stack are:

h=48 mils
w–110 mils
$d_S$=120 mils
$d_E$=140 mils

The cross section of the encasement 52 is specifically and deliberately round. This configuration is preferred for ease in manufacture, ease in installation, and for other important reasons. For example, it will be evident on inspection of FIG. 8, for example, that the amount of material available to cushion the optical fiber ribbon stack when the cable is bent on the preferred bending axis is substantial, i.e. thickness $t_1$ in FIG. 8 is greater than thickness $t_2$. Since the optical fiber ribbons are flexible, this provides additional stress relief where it is most desired. Moreover, it will be evident that the preferred bending axis of both of the cable structures shown in FIGS. 5 and 6 is attenuated by the encasement layer 52 (FIG. 5), or the combination of layers 52 and 53 (FIG. 6). This allows the stresses that produce the wrinkles (FIGS. 3 and 4) to be distributed more effectively around the outside surface of the cable, thereby reducing the tendency of the ribbon to buckle or form wrinkles.

Figure 9:
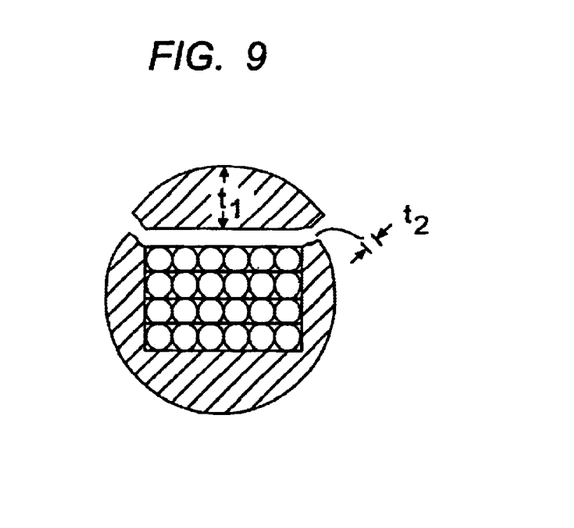
FIG. 9 is a cross section of a cable with twelve units similar to that shown in FIG. 5.

Another advantage of the structure represented by FIG. 8, i.e. an optical fiber ribbon stack cable with a round cross section, is that there is a built-in tear strip. This is illustrated in FIG. 9, where the force required to tear the encasement layer 52 is much smaller at the corners of the optical fiber ribbon stack than at other places around the cable circumference. This built-in tear strip comes with no additional cost or processing. The thickness $t_2$ of the encasement layer 52 is preferably designed to allow ease of tearing. The thickness required for this will depend on the properties of the material that forms layer 52. As an example, for typical low-density polyethylenes, the dimension $t_2$ is preferably 3–10 mils.

The amount of adhesion desired between the optical fiber ribbon stack and the surrounding encasement may vary substantially depending on the system design. If adhesion is too low, stress on encasement layer 52 will not be effectively translated to the optical fiber ribbon stack.

For meaningful quantitative measures of adhesion a uniform test procedure should be established and followed. Adhesion values will vary substantially depending on the nature of the article being tested, and the test procedure. Pull tests may be used to measure this property in optical fiber cable. This is a relatively simple test in which the encasement is held stationary, and one or more of the optical fiber ribbons are pulled from the encasement. The adhesion between the optical fiber ribbons and the encasement is measured mostly in a shear mode rather than the more common tensile mode (where the force measured is that required to separate two surfaces by force applied normal to one of the surfaces). However, in an optical fiber ribbon cable, longitudinal forces are more relevant, in the context of the invention, than forces normal to the cable surface. In view of this the pull test procedure described below is the more valid adhesion test.

1. Cut 5 specimens of the encased ribbon 4¼ inches (114.3 mm) long from a spool.
2. With a permanent marker, mark a section 1-inch long in the center of each sample.
3. If there is no outermost layer, skip to step 4. If there is an outer layer of jacketing, remove it as follows: Using a razor blade, score around the circumference of the outer tube along one marking. Score from this cut longitudinally down the shorter end of the tube to the end. Remove the outer layer of tubing from this section.
4. Cut the encasement longitudinally along the side of one of the ribbons from one marking to the end. Then, cut the encasement (circumferentially) at the marking, being careful not to cut the ribbons. The encasement should come off, leaving only ribbons exposed past the marking.
5. On the other end, use a razor blade to cut the tube almost in half, along one of the ribbons to the mark. Peel back the encasement and the outer shell (if there is one) from the ribbons. Cut the ribbons off as close to the mark as possible. This should leave a tube sliced in half, without ribbons up to the mark on this side.
6. The specimen should only be completely intact and unchanged within the 1-inch gauge length between the marks.
7. Repeat steps 1–6 to create total of 5 specimens.
8. Using 2-part Hardman 5 minute epoxy, or similar quick-setting material, coat the exposed ribbon stack on each sample with glue, securing them together. Be careful not to glue the ribbons to the 1-inch gauge length in the center.
9. Using the same epoxy, secure the two "half tubes" on the other end together, coating them in epoxy. Be careful not to get any epoxy on the cut-off exposed ribbons.
10. Let the epoxy dry for about 30 minutes. Trim the epoxy with scissors if any large clumps exist.
11. Use a tensile testing machine, such as one manufactured by the Instron Corporation, fitted with an appropriate load cell and pneumatic C-clamp grips for pull-out tests. The distance between the clamps should be 1½ inches. The crosshead speed for the test is 1 inch/min. Center the sample gauge length between the clamps for each test.
12. Test all 5 samples. Data is recorded as load vs. displacement. The desired results from the test are maximum load, and energy (defined as the area under the curve between designated displacements). The displacements used in this test were 0.0 inches and 0.5 inches. Report the average maximum load and average energy for the 5 samples. "Adhesion" is reported as the maximum load measured during the test.

Note that in this test, the optical fiber ribbon stack is pulled, not individual ribbons. This measures the adhesive force between the encasement and the optical fiber ribbon stack, and is therefore relatively unaffected by the adhesive force between the ribbons themselves.

Pull test data on an optical fiber ribbon stack cable with two ribbons having six fibers per ribbon resulted in an adhesion of 5.47 lb (24.33N). The energy required to pull the optical fiber ribbon stack from the encasement was 1.68 lbf-in (2.94 N-cm). The encasement was a low-density polyethylene and the coating on the optical fiber ribbons was a. UV cured acrylate.

For a comparative test, a similar unit was prepared that had a coating of polyalphaolefin oil to reduce the adhesion between the optical fiber ribbon stack and the encasement. The maximum adhesion measured for this case was 0.97 lbs (3.87 N). The energy required in this case was 0.118 lbf-in (0.21 N-cm).

These values will vary depending on the cable size and configuration, the materials used for the optical fiber ribbon coating, the material used for the encasement, the temperature of the cable when measured, etc. Therefore it is imprecise to attach a specific value or range to the adhesion recommended for the invention. However, it may be specified that preferably no adhesion retarder (lubricant) should be used. This can be defined as having the encasement layer and the optical fibers or ribbon stack in intimate contact. Alternatively, the predominant portion of the optical fiber ribbon stack (accounting for small surface regions that may be occupied by bundling and/or waterblocking material, e.g. yarn) and the encasement are defined as adjoining, meaning touching, with no other material in between.

The encasement may comprise more than one layer, each having the properties indicated. In some cases, it may be advantageous to have an inner adhesive encasement layer adjoining the optical fiber stack.

Normally adhesion in the desired range will occur as the result of the intrinsic material characteristics, i.e. the polymer-to-polymer intrinsic adhesion. The result desired, i.e. the adhesion recommended, is easily obtained using known extrusion manufacturing methods. Other approaches may also be found useful. For example, the encasement may be a UV curable polymer, and applied by conventional UV cured coating techniques.

Another important property in the context of the invention is the shrinkage of the encasement layer. This is an alternative indication of the main property of interest, i.e. the effectiveness with which compressive force on the outside of the encasement is translated to the optical fiber ribbon stack. To determine this, the nominal shrinkage of the encasement materials is known or measured. Then the degree to which that shrinkage is reduced in the cabled product is a measure of the degree to which the optical fiber ribbon stack and the encasement are "attached".

Shrinkage in cable technology is well known and understood. It is commonly referred to as "shrinkback" and is the phenomenon where a unit becomes shorter upon extended exposure to high temperature. This phenomenon occurs due to the relaxation/equilibration of the polymeric materials used as the jacket/encasement of the unit. Polymer chains trapped in high-energy stretched configurations can relax and shrink at high temperature; also, in units made from semicrystalline polymers (as in this case), secondary crystallization can occur, in which the density of the unit may increase (with resulting shrinkage of the unit).

To test shrinkback in the context of this invention, approximately 10-inch lengths of the unit were cut and held at 85° C. for 90 minutes to drive shrinkback. Further experiments confirmed that 90 minutes was sufficient for these units to reach equilibrium. For the encased units, we measured shrinkback of 0.22%, on average. For comparison, we slit other encased units longitudinally and removed the ribbons; these exhibited an average shrinkback of 2.33%. This means that the shrinkage of the encased (cabled) unit is reduced by 90% and shows that by encasing the ribbons in the unit, an effective composite is produced in which the fiber ribbons reinforce the encasing medium.

In contrast to the quantitative adhesion measurement, the shrinkage measurement is easily quantified. Moreover, this measurement reflects the combination of properties desired, i.e. the adhesion between the optical fiber ribbon stack, and the elastic modulus of the encasement material. If no shrinkage, or low shrinkage occurs, this means that the optical fiber ribbon stack and the encasement are effectively coupled, and that the optical fiber ribbon stack is reinforcing the unit against compressive force. That is a goal of the invention. Accordingly, it is meaningful to prescribe that in the preferred case the shrinkage of the optical fiber ribbon stack cable unit (with the encasement applied), measured at equilibrium at 85° C., is less than 40%, and preferably less less 20%, of the intrinsic shrinkage of the encasement material.

The term "encasement" is used herein to describe the primary medium 52 that surrounds the optical fiber ribbon stack. As indicated earlier, there may or may not be an additional coating or cable sheath in the optical fiber ribbon cable product of the invention.

Figure 10:
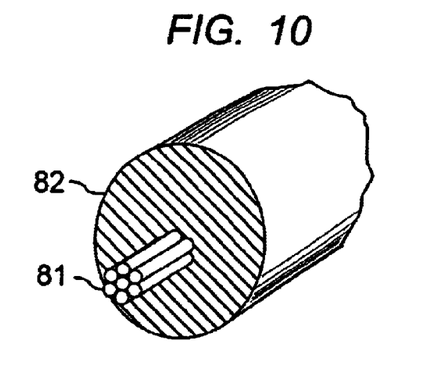
FIG. 10 is a perspective view of a cable with an optical fiber bundle of seven optical fibers in a coupled encasement.

While the description of FIGS. 1–9 is largely in terms of optical fiber ribbon cable as a main species of optical fiber bundle cables, it should be evident that the invention applies to other forms of optical fiber bundle cable. One of those is shown in FIG. 10, where the optical fiber bundle is shown with seven fibers 81 tightly encased in the primary encasement 82. Again, any number of optical fibers in any suitable configuration may be used. In each case, according to the invention, the optical fiber bundle is encased in an encasement having the properties described earlier.

Figure 11:
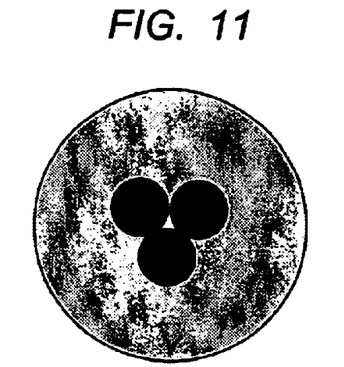
FIGS. 11–14 shows various geometries for optical fiber bundles in an optical fiber cable.
Figure 12:
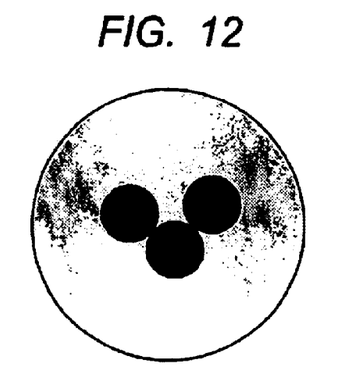
Figure 13:
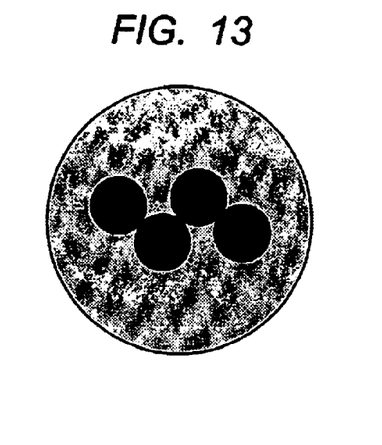
Figure 14:
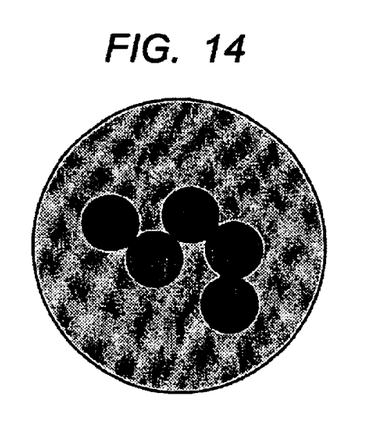

As shown in FIG. 10, when more than one optical fiber is included in a random optical fiber bundle, the fibers are reeled and encased in such a way that the optical fibers touch one another. If three optical fibers are used, and each fibers touches two other fibers a channel forms inside the optical fiber bundle. This is illustrated in FIG. 11. This is also the case in FIG. 10, or whenever three or more fibers are bundled. The channel allows water to channel along the fiber bundle. Even when there is a single point of entry (single location of cable damage) for the water, channeling of the water may allow an extensive length of cable to be flooded. Accordingly, it is preferred, when more than three optical fibers are encased in a loose bundle, that each optical fiber touch one or two other fibers, but not three. These configurations are shown in FIGS. 12 through 14, for three, four, and five optical fiber bundles respectively. In these embodiments it will be appreciated that there may be incidental touching of three optical fibers along the cable length but the predominant cable structure is made to avoid extensive voids along the cable length.

The primary encasement in each of the embodiments described may be produced using extrusion, or by UV curing a UV-curable resin. In the preferred case the encasement is a thermoplastic material applied by extrusion.

Figure 15:
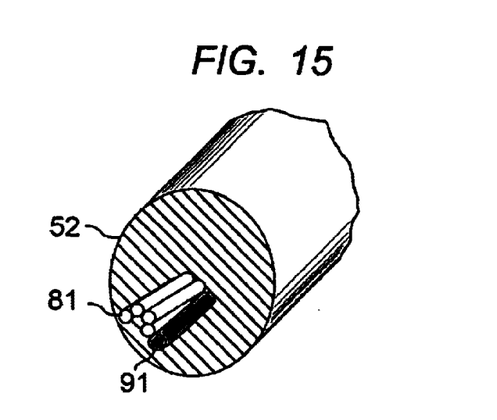
FIG. 15 shows the optical fiber cable of FIG. 10 with an added rip cord.

The cable cross section shown in these figures is circular. However, oval cross sections are suitable as well. In the embodiments with a round or oval cross section, unlike the ribbon cable embodiments (see FIG. 9), do not have a built-in tear strip. Accordingly, as shown in FIG. 15, a rip cord 91 may be provided to assist in stripping the encasement for splicing the optical fibers 81.

As is well known in the art each of the optical fibers is provided with an optical fiber coating. For simplicity, the optical fiber coating is not shown in the figures. It should be understood that in the embodiments of FIGS. 10–14, it is preferred to have the encasement contact the optical fiber coating directly, i.e. there is no additional coating in between. This offers an advantage over conventional ribbon structures that have an additional coating used to form the ribbon. However, the invention represented by FIG. 10 may also be practiced with an additional coating forming the ribbon or bundle. Similar considerations apply to the embodiments represented by FIG. 5. The ribbon stack may be formed with no additional coatings between the optical fiber coatings and the encasement, or it may have optical fiber ribbon coatings over the assembly forming the optical fiber ribbons, or it may have a coating over the optical fiber stack. Preferably, the latter is absent. In each case, the one or more encasements are mutually coupled, and coupled to the optical fiber bundle, thereby providing a unitary polymer body which is preferably essentially solid polymer, except for the glass of the optical fibers. As mentioned earlier, an aramid or fiberglass yarn may be used to aid in bundling the fibers. This may be especially desired where the bundle is a plurality of fibers in loose or randomly arranged positions.

The term encasement or encasing is meant to specify that the encasement contacts the optical fiber coating. In the case of bundles of individual optical fibers this typically will mean that the encasement contacts the optical fiber coating directly. In the embodiments where the optical fibers are organized in a ribbon configuration, with a ribbon coating over the individual optical fibers, these terms mean that the encasement contacts the ribbon coating directly.

The term plurality below is used as meaning more than one.

The term optical fiber is well established in the art and means a glass fiber comprising a core and cladding, and a polymer coating over the glass fiber.

As noted earlier, the cross section of the cable may be circular or oval. The term "essentially circular" is intended to include oval shapes.

Various additional modifications of this invention will occur to those skilled in the art. All deviations from the specific teachings of this specification that basically rely on the principles and their equivalents through which the art has been advanced are properly considered within the scope of the invention as described and claimed.

What is claimed is:

1. An optical fiber cable comprising:
   (a) an optical fiber bundle comprising a plurality of longitudinally extending optical fibers,
   (b) a solid polymer encasement having an essentially circular cross section conformally encasing and contacting the optical fiber bundle.

2. The optical fiber cable of claim 1 wherein the encasement is a polymer having an elastic modulus greater than 210 MPa at 23° C.

3. The optical fiber cable of claim 1 wherein the optical fiber bundle is selected from the group consisting essentially of:
   a. 2–20 optical fibers randomly arranged, and
   b. at least one optical fiber ribbon of at least 3 optical fibers, the optical fibers having centers c, with the centers c lying on a common axis.

4. The optical fiber cable of claim 1 wherein the shrinkage of the optical fiber cable as measured by heating to 85° C. is less than 40% of the shrinkage of the material forming the encasement as measured by heating to 85° C.

5. The optical fiber cable of claim 2 wherein the shrinkage of the optical fiber cable as measured by heating to 85° C. is less than 20% of the shrinkage of the material forming the encasement as measured by heating to 85° C.

6. The optical fiber cable of claim 1 additionally including an additional polymer layer over the encasement.

7. The optical fiber cable of claim 6 wherein the additional polymer layer has an elastic modulus greater than that of the primary encasement.

8. The optical fiber cable of claim 1 wherein the minimum thickness of the encasement layer is in the range 3–15 mils.

9. The optical fiber cable of claim 1 wherein the encasement is low-density polyethylene.

10. The optical fiber cable of claim 3 wherein the optical fiber bundle comprises 2–20 randomly arranged fibers.

11. The optical fiber cable of claim 3 wherein the optical fiber bundle comprises at least 3 optical fibers with centers c on a common axis.

12. The optical fiber cable of claim 10 wherein each of the optical fibers is coated with an optical fiber coating, and the encasement contacts the optical fiber coating.

13. The optical fiber cable of claim 11 wherein the optical fiber bundle has a ribbon coating to form an optical fiber ribbon and the encasement contacts the ribbon coating.

14. The optical fiber cable of claim 13 comprising a plurality of stacked optical fiber ribbons.

15. The optical fiber cable of claim 3 wherein the encasement is essentially void-free.

16. The optical fiber cable of claim 15 wherein each optical fiber in the 2–20 optical fibers bundle essentially contacts no more than two other optical fibers.

* * * * *